United States Patent [19]

Nakamura et al.

[11] Patent Number: 4,997,169
[45] Date of Patent: Mar. 5, 1991

[54] HYDRAULICALLY DAMPED MOUNT

[75] Inventors: Masahiro Nakamura, Dublin, Ohio; Yasuo Miyamoto; Kazutaka Suzuki, both of Tochigi, Japan; Hiroshi Yoshida, Nagano; Masanori Minami; Keiichi Uchiyama, both of Tochigi, all of Japan

[73] Assignee: Honda Giken Kogyo Kabushiki Kaisha, Tokyo, Japan

[21] Appl. No.: 388,440

[22] Filed: Aug. 2, 1989

[30] Foreign Application Priority Data

| Aug. 3, 1988 | [JP] | Japan | 63-102908[U] |
| Aug. 3, 1988 | [JP] | Japan | 63-102909[U] |
| Aug. 3, 1988 | [JP] | Japan | 63-102910[U] |
| Aug. 30, 1988 | [JP] | Japan | 63-113778[U] |
| Aug. 30, 1988 | [JP] | Japan | 63-113779[U] |

[51] Int. Cl.$^5$ ............................ F16F 13/00
[52] U.S. Cl. ..................... 267/140.1; 248/562; 267/212
[58] Field of Search ............... 267/140.1 A, 140.1 R, 267/140.1 AE, 219, 35; 248/562

[56] References Cited

U.S. PATENT DOCUMENTS

| 4,159,091 | 6/1979 | Le Salver et al. | 248/562 |
| 4,632,372 | 12/1986 | Nakajima et al. | 267/140.1 |
| 4,741,520 | 5/1988 | Bellamy et al. | 267/140.1 X |
| 4,753,422 | 6/1988 | Thorn | 267/219 |
| 4,762,309 | 8/1988 | Hutchins | 267/140.1 |
| 4,787,611 | 11/1988 | Sciotino | 267/140.1 |

FOREIGN PATENT DOCUMENTS

| 2041488 | 9/1980 | European Pat. Off. . |
| 0038062 | 10/1981 | European Pat. Off. . |
| 0187188 | 6/1985 | European Pat. Off. . |
| 0231898 | 8/1987 | European Pat. Off. ......... 267/140.1 |
| 0262544 | 4/1988 | European Pat. Off. . |
| 2206947 | 1/1989 | European Pat. Off. . |
| 2415241 | 8/1979 | France . |
| 2615260 | 11/1988 | France . |
| 59-110931 | 6/1984 | Japan . |
| 61-52439 | 3/1986 | Japan . |
| 0021239 | 1/1989 | Japan .............................. 267/140.1 |
| 63-74856 | 12/1989 | Japan . |

OTHER PUBLICATIONS

Automotive Engineer, vol. 12, No. 1, Feb./Mar. 1987, pp. 17–19 "Hydraulically-Damped Engine-Mounting".

Primary Examiner—Matthew C. Graham
Attorney, Agent, or Firm—Armstrong, Nikaido, Marmelstein, Kubovcik & Murray

[57] ABSTRACT

A hydraulically damped mount includes a mounting element fixed to a moving component and a support fixed to a stationary component. A resilient element is connected between the mounting element and the support and cooperates with a diaphragm to define a fluid chamber. The fluid chamber is divided into a working chamber and a compensation chamber by a partition assembly. The partition assembly has an upper plate and a lower plate joined together to define a space within which a movable plate is vertically movable to absorb movement of the fluid caused by a change in pressure in the working chamber. A spacer is centrally disposed in the upper and lower plates to provide a constant distance therebetween.

23 Claims, 13 Drawing Sheets

HYDRAULICALLY DAMPED MOUNT

BACKGROUND OF THE INVENTION

1. Field of the Invention

The present invention relates to improvements in hydraulically damped mounts.

2. Description of the Related Art

A wide variety of mounts have been proposed to resiliently support a moving machinery such as vehicle engine and prevent the vibration of the moving machinery being transmitted to another component.

Japanese utility model application No. 63-74856 discloses a fluid damped mounting device which includes a boss fixed to an engine, and a generally annular support fixed to a vehicle frame. A resilient element is connected between the boss and the support and cooperates with a diaphragm to define a fluid chamber. The fluid chamber is filled with a fluid and divided into a working chamber and a compensation chamber by means of a partition assembly. The partition assembly includes two disks joined together in a manner to define a space therebetween. A movable plate is arranged within the space and is vertically movable. When the engine vibrates, the resilient element is subject to flexing. This causes a change in the volume of the working chamber. For small amplitude vibrations, displacement of the movable plate absorbs the movement of the fluid caused by the change in the volume of the working chamber. The two disks are likely to flex, particularly at their center, due to fluid pressure. If flexed, movable distance of the movable plate would be reduced, and the movement of the fluid may not be appropriately absorbed.

SUMMARY OF THE INVENTION

Therefore, it is an object of the invention to provide a hydraulically damped mount which can properly absorb the movement of fluid to be caused by a change in the volume of a working chamber when small amplitude vibrations occur, and which ensures the desired damping effect.

According to one embodiment of the invention, a hydraulically damped mount comprises a frustoconical-shaped resilient element interconnected between a mounting element fixed to a moving machinery such as an vehicle engine and a support fixed to a stationary support such as a vehicle frame. A diaphragm is secured to the support and cooperates with the resilient element to define a fluid chamber filled with an imcompressible fluid such as an oil. The chamber is divided by a partition assembly into a working chamber and a compensation chamber. The partition assembly includes an upper plate and a lower plate joined together in a manner to define a space therebetween. A movable plate is arranged within the space and is vertically movable. When small amplitude vibrations are applied to the mounting element, the resilient element is flexed. This causes a change in the volume of the working chamber. The movable plate then absorbs the movement of the oil caused by the change in the volume of the working chamber. A spacer is centrally positioned in the upper and lower plates to maintain a constant distance between the two plates whereby movable range of the movable plate in the vertical direction is always kept constant.

A press member, in the form of an inverted-U cup, is fixed to the mounting element or disk. When the engine vibrates, the frustoconical resilient element tends to expand outwardly due to an increase in pressure in the working chamber. The press member is adapted to push down the expanded area of the resilient element so as to prevent the undesirable reduction of the effective cross area of the resilient element acting as a piston.

A protection cover is fixedly attached to the press member to prevent the resilient element from heat, for instance, dissipated from the engine. The upper section of the cover is secured to the inner surface of the press member and has an annular recess within which the rim or peripheral edge of the mounting disk is received to hold the cover in position.

A stopper means is provided to prevent the resilient element from being excessively deformed. Such stopper means comprises a first annular projection formed on the lower surface of the resilient element and a second annular projection formed on the upper surface of the upper plate of the partition assembly. When considerably large amplitude vibrations occur, the first and second projections are brought into contact with the upper surface of the upper plate and the lower surface of the resilient element, respectively to prevent excess deformation of the resilient element. Upon such contact, the working chamber is divided into an inner chamber and an outer chamber. In order to provide a fluid communication between the inner and outer chambers, a plurality of radial grooves are formed in the second projection. Alternatively, such radial grooves may be formed in the lower surface of the resilient element. This prevents fluid pressure in the inner chamber from being excessively increased. A small opening may also be formed in the movable plate to provide a fluid communication between the inner chamber and the compensation chamber. Alternatively, a recess may be formed in the outer peripheral edge of the movable plate. Still alternatively, a through hole may extend axially through the spacer.

The volume of the compensation chamber is rendered variable by deformation of the diaphragm to compensate for movement of fluid between the working chamber and the compensation chamber. The diaphragm has a relatively low coefficient of elasticity and is more deformable than the resilient element. The diaphragm has a thick portion on which an annualr ridge is formed. The annular ridge is normally in contact with the lower surface of the lower plate so as to provide a constant distance between the diaphragm and the partition assembly and thus, to keep the volume of the compensation chamber constant.

BRIEF DESCRIPTION OF THE DRAWINGS

A better understanding of the invention may be had by reference to the following detailed description when taken in conjunction with the accompanying drawings, in which.

DESCRIPTION OF THE PREFERRED EMBODIMENTS

Like reference characters indicate like or corresponding parts throughout the drawings.

Figure 1:
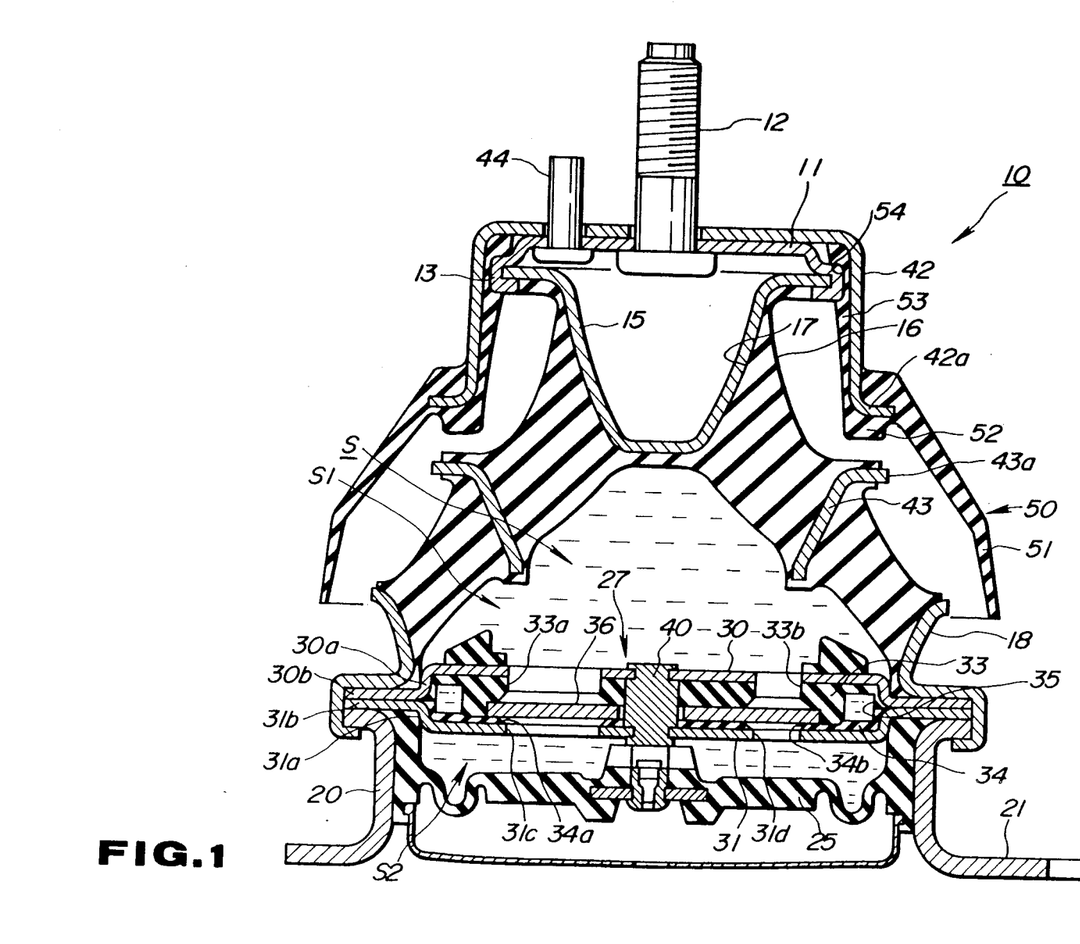
FIG. 1 is a sectional view of a hydraulically damped mount according to one embodiment of the invention.

With now reference to FIG. 1, there is shown a hydraulically damped mount constructed according to the teachings of the present invention and generally indicated at 10. The mount 10 includes a mounting element or disk 11 connected by a bolt 12 to any moving machinery such as a reciprocating engine (not shown) and having a peripheral edge 13 extending over the rim of a cup 15. A resilient element or spring element 16, made of rubber or similar material, is of a frustoconical shape and has a central recess 17 within which the cup 15 is received. A bracket 18 is secured to the lower part of the resilient element 16 and extends over the rim of a generally cylindrical support 20. The support 20 has an annular flange 21 seated on a vehicle frame (not shown) and secured thereto by a fixing bolt (not shown).

A deformable element or diaphragm 25, made of rubber or similar material, is secured to the inner peripheral wall of the support 20 and cooperates with the resilient element 16 to define a fluid chamber S. The chamber S is filled with a suitable imcompressible fluid such as an oil, and is divided into an upper or a working chamber S1 and a lower or a compensation chamber S2 by means of a partition assembly 27.

Figure 2:
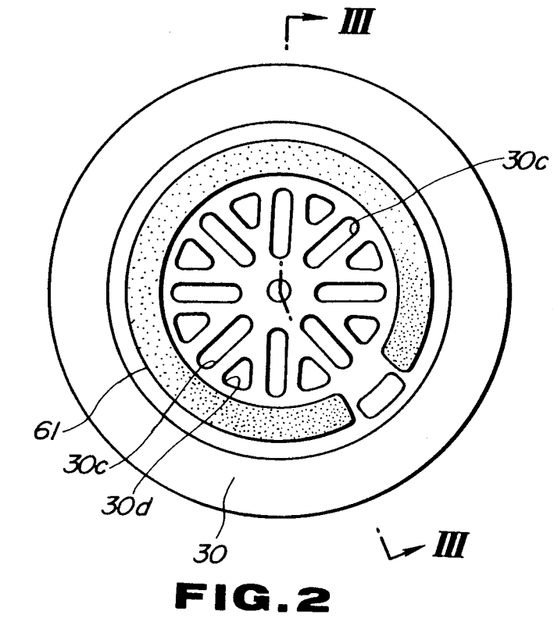
FIG. 2 is a plan view of an upper plate of a partition assembly shown in FIG. 1.
Figure 3:
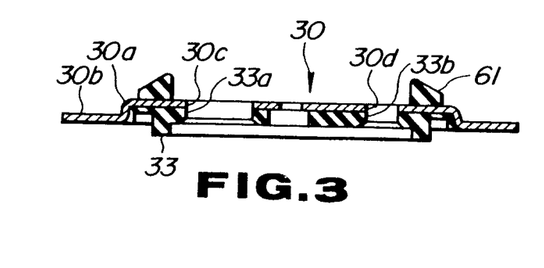
FIG. 3 is a sectional view taken along the line III—III of FIG. 2.
Figure 4:
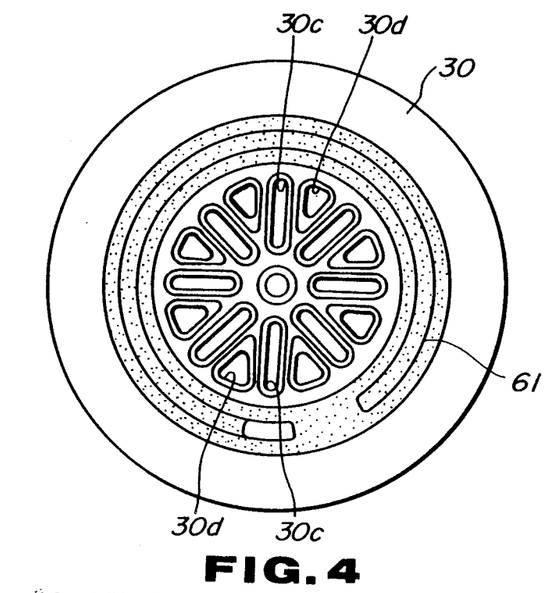
FIG. 4 is a bottom view of the upper plate shown in FIG. 2.

The partition assembly 27 includes an upper metal plate 30 and a lower metal plate 31. These plates 30, 31 have steps 30a, 31a by which the resilient element 16 and the diaphragm 25 are held in position. Extending outwardly from the steps 30a, 31a are annular flanges 30b, 31b sandwiched between the bracket 18 and the rim of the support 20. As best seen in FIG. 2 to 4, the upper plate 30 has a plurality of elongated radial openings 30c formed at circumferentially equally spaced intervals and a plurality of sectorial openings 30d formed between each two adjacent elongated openings 30c. Likewise, the lower plate 31 has a plurality of elongated radial openings 31c and a plurality of sectorial openings 31d.

Fitted within a space defined by the two plates 30, 31 are two restriction elements 33, 34, made of rubber or similar material. The restriction elements 33, 34 have openings similar to those openings formed in the upper and lower plates 30, 31. Specifically, the restriction elements 33, 34 have a plurality of elongated openings 33a, 34a and a plurality of sectorial or triangular openings 33b, 34b (see FIG. 1), respectively. It will be noted that conventionally, such restriction elements had a multiplicity of small openings. In order to form such small openings, a mold was required to have a corresponding number of cylindrical projections thereon. However, those number of cylindrical projections tends to prevent smooth flow of rubber in liquid form when introduced into the mold. In the illustrated embodiment, flow path of rubber in liquid form is much simpler. It flows almost straight along each elongated projections formed in a mold.

A passage 35 extends around the circumference of the two restriction elements 33, 34 and has one end in communication with the working chamber S1 through an opening (not shown) formed in the upper plate 30 and the other end in communication with the compensation chamber S2 through an opening (not shown) formed in the lower plate 31. This annular passage 35 is much longer than those axial openings as in a conventional mount and is thus capable of providing greater damping.

A movable plate 36 is placed between the two restriction elements 33, 34 in a manner to close the openings (as formed by 30c, 30d, 31c, 31d, 33a, 33b, 34a, and 34b). Vibrations of the engine relative to the vehicle frame causes the two anchore points or fixing bolts to vibrate relative to each other. This results in flexing of the resilient element 16, thereby changing the volume of the working chamber S1. For small amplitude vibrations, vertical displacement of the movable plate 36 absorbs the movement of the fluid or oil caused by the change in the volume of the working chamber S1.

Figure 5:
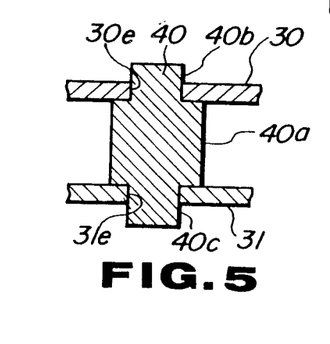
FIGS. 5 and 6 show the manner in which a spacer is fixedly attached to the upper and lower plates of the partition assembly.
Figure 6:
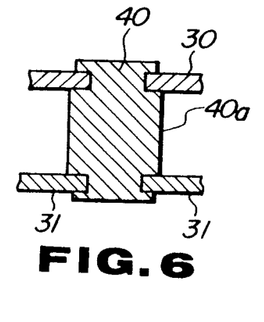

It will be understood that the two plates 30, 31 may be flexed, particularly at their center. Such flexure will change the distance between the two plates, and may prevent proper vertical movement of the movable plate 36. In the illustrated embodiment, a cylindrical spacer 40, made of suitable metal, is placed centrally in the two plates 30, 31 so as to maintain a constant distance or space therebetween. The spacer 40 has a large-diameter section 40a, an upper small-diameter section 40b, and a lower small-diameter section 40c. In assembly, the upper small-diameter section 40b is inserted into an opening 30e formed centrally in the upper plate 30, and the lower small-diameter section 40c is inserted into an opening 31e formed centrally in the lower plate 31 as seen in FIG. 5. Sufficient pressure is then applied by suitable means to the end surfaces of the upper and lower small-diameter sections 40b and 40c, respectively to hold the spacer 40 in position as best seen in FIG. 6.

When the mounting disk 11 and thus the cup 15 are moved downward, the intermediate portion of the frustoconical resilient element 16 would normally tend to expand outwardly due to an increase in pressure in the working chamber S1. Such outward expansion will reduce the effective crosssectional area of the resilient element 16 as a piston and thus reduce the desired flow of fluid from the working chamber S1 to the compensation chamber S2. In the illustrated embodiment, in order to prevent such outward expansion of the resilient element 16, a press member 42 cooperates with an annular metal ring 43. More specifically, the press member 42, in the form of an inverted U cup, is fixed by a bolt 44 to the disk 11 and has a flange 42a. The annular ring 43 extends into the intermediate portion of the resilient element 16 and has a flange 43a facing the flange 42a of the press member 42. When the disk 11 is moved downward, the press member 42 is also moved downward, and the flange 42a is moved into contact with the flange 43a of the annular ring 43 so as to press or push down the intermediate portion of the resilient element 16. This prevents the undesirable reduction in the effective cross area of the resilient element 16 acting as a piston and thus provides greater damping.

The mount 10 may be thermally affected, for example, when used as an engine mounting. Heating may change the characteristics of the resilient element 16 and would have a detrimental effect on the behaviour of the mount 10. In the illustrated embodiment, a protection cover 50 is provided to prevent the mount 10 from such heat. Specifically, the cover 50 includes, in a unitary fashion, a lower section or skirt 51 adapted to surround the lower half of the resilient element 16, an intermediate portion 52 within which the flange 42a of the press member 42 is embedded, and an upper cylindrical section 53 secured to the inner peripheral surface of the press member 42 and having at its upper end an annular recess 54 within which the peripheral edge 13 of the disk 11 is received for engagement. It will be noted that the cover 50 is attached to the press member 42 before they are assembled to the disk 11. The inner diameter of the upper section 53 of the cover 50 gradually increases in a direction toward the partition 27. This arrangement makes it easier to fit the cover/press member over the disk from thereabove.

Figure 7:
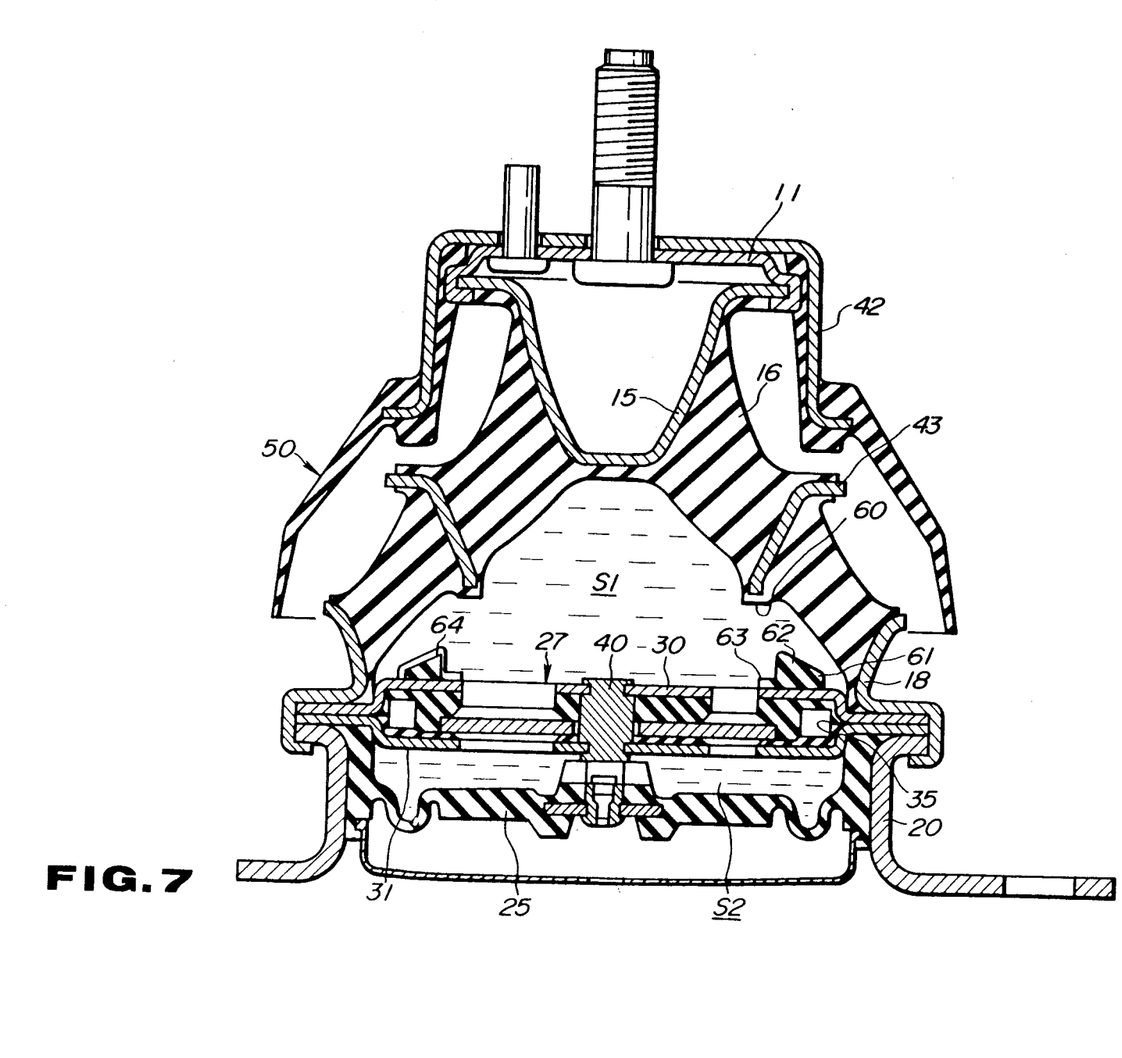
FIG. 7 is a sectional view of the mount showing a plurality of radial grooves formed in an annular projection.
Figure 8:
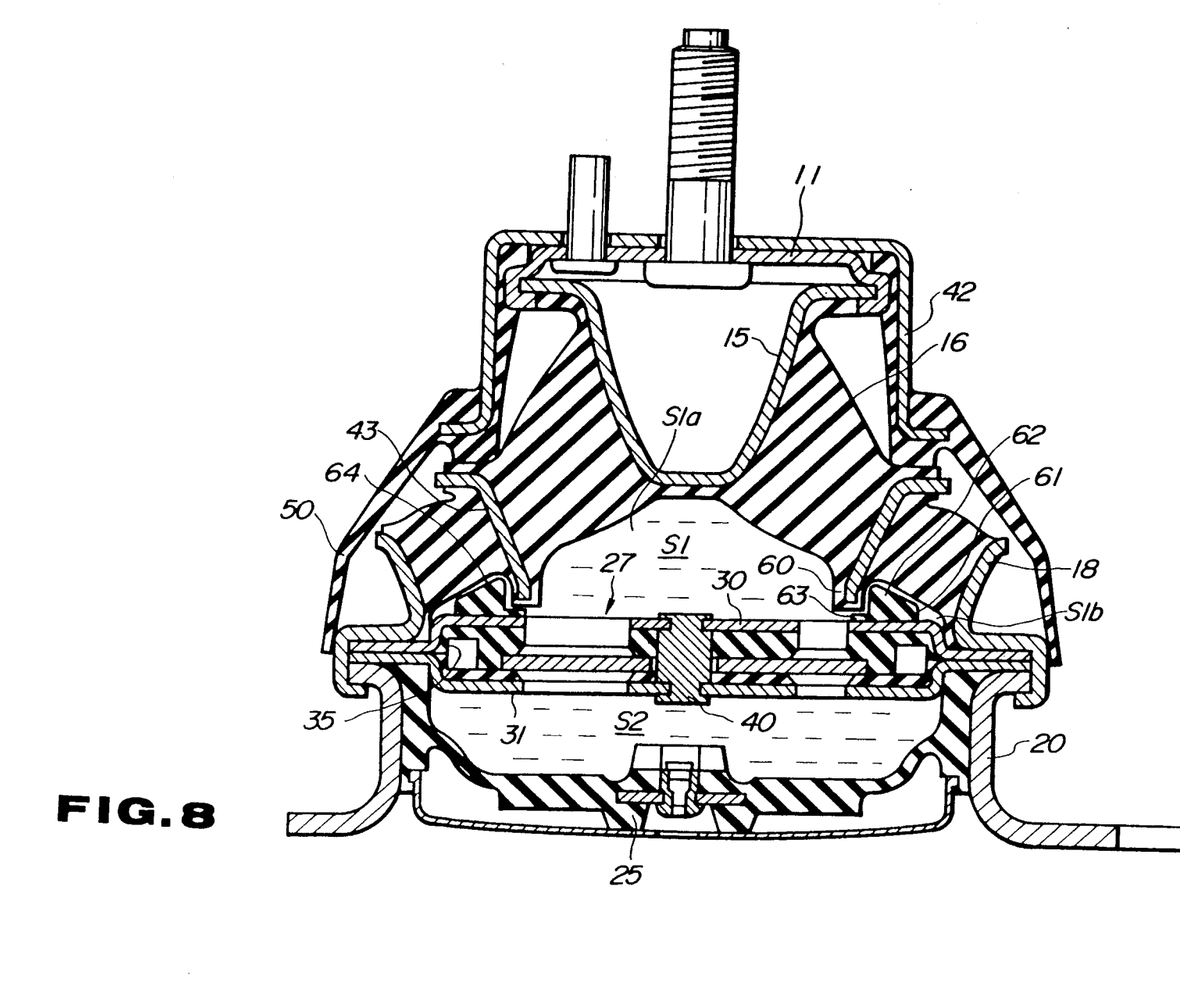
FIG. 8 is a view similar to FIG. 7, but showing a resilient element in its contracted state.
Figure 9:
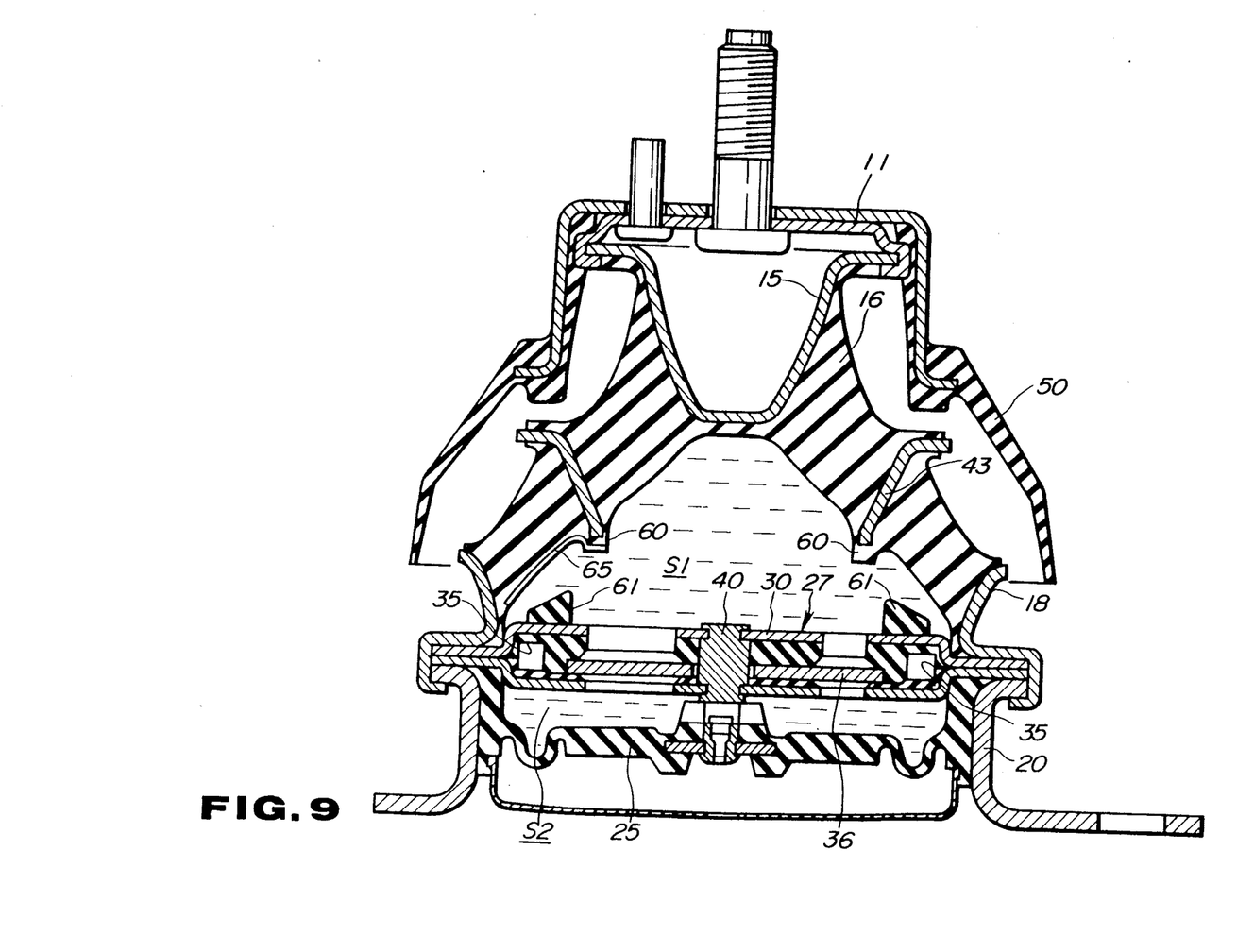
FIG. 9 is a view similar to FIG. 7, but showing a modified form of radial grooves.

With reference to FIG. 7, the resilient element 16 includes an annular projection 60 extending downwardly from its lower surface. There is also provided an annular projection 61 seated on the upper surface of the upper plate 30 and having a tapered surface 62 and a horizontal surface 63. Both of these projections 60, 61 act as a stopper. When considerably large amplitude vibrations occur, the annular projection 60 is moved into contact with the horizontal surface 63 of the projection 61 and at the same time, the tapered surface 62 of the projection 61 is brought into contact with the lower surface of the resilient element 16, as best seen in FIG. 8. Under these circumstances, the working chamber S1 is divided into an inner chamber S1a and an outer chamber S1b. In order to provide a fluid communication between the inner chamber S1a and the outer chamber S1b, the projection 61 has a plurality of radial grooves 64 formed at circumferentially equally spaced intervals as shown in FIG. 8. Alternatively, such radial grooves, as indicated at 65 in FIG. 9, may be formed, at circumferentially equally spaced intervals, in the lower surface of the resilient element 16. Each of these grooves 65 extends from the lower surface of the projection 60 and terminates at near the lower end of the resilient element 16. Upon communication between the inner and outer chambers, fluid pressure within the inner chamber S1a is prevented from being excessively increased, even if the resilient element 16 is further flexed downwardly.

Figure 10:
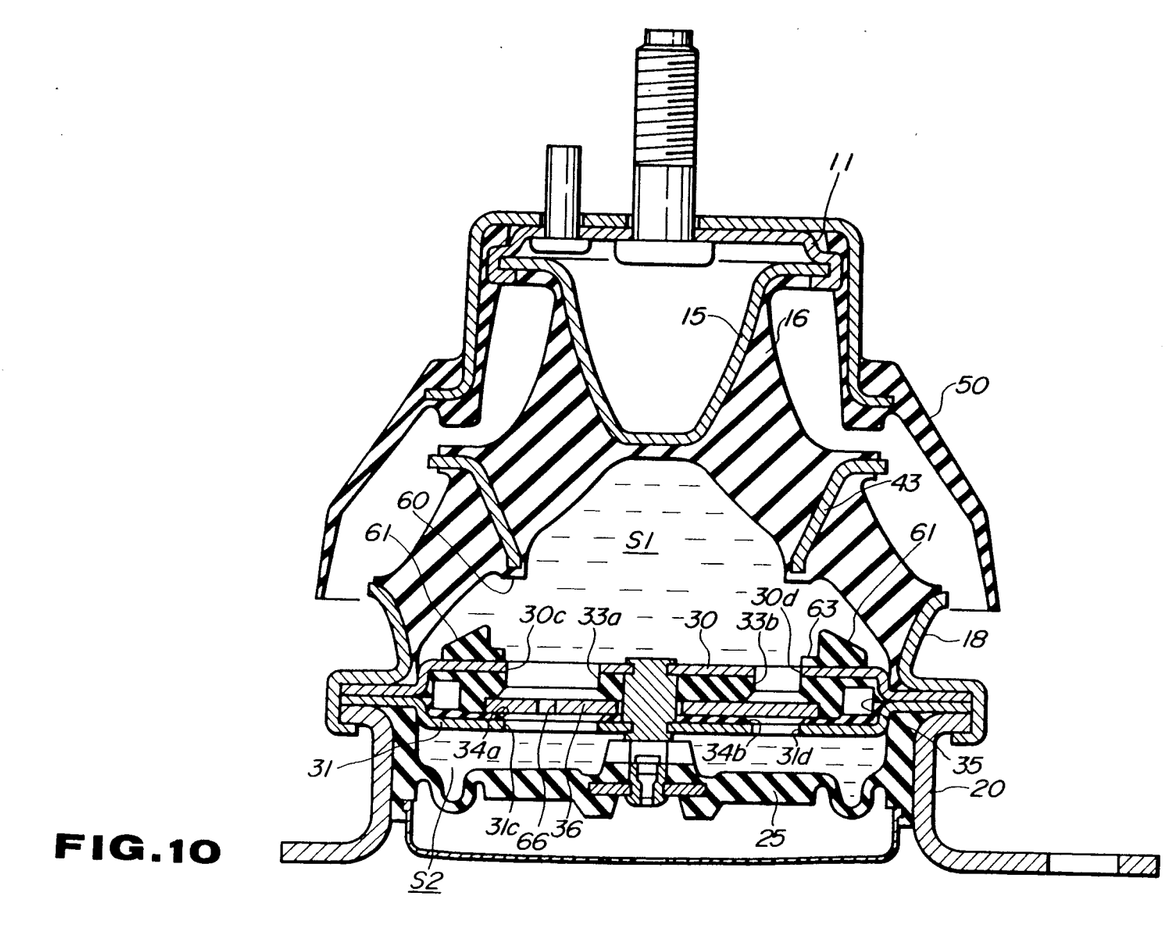
FIGS. 10 to 12 are views similar to FIG. 7, but each showing means for providing a fluid communication between a working chamber and a compensation chamber.
Figure 11:
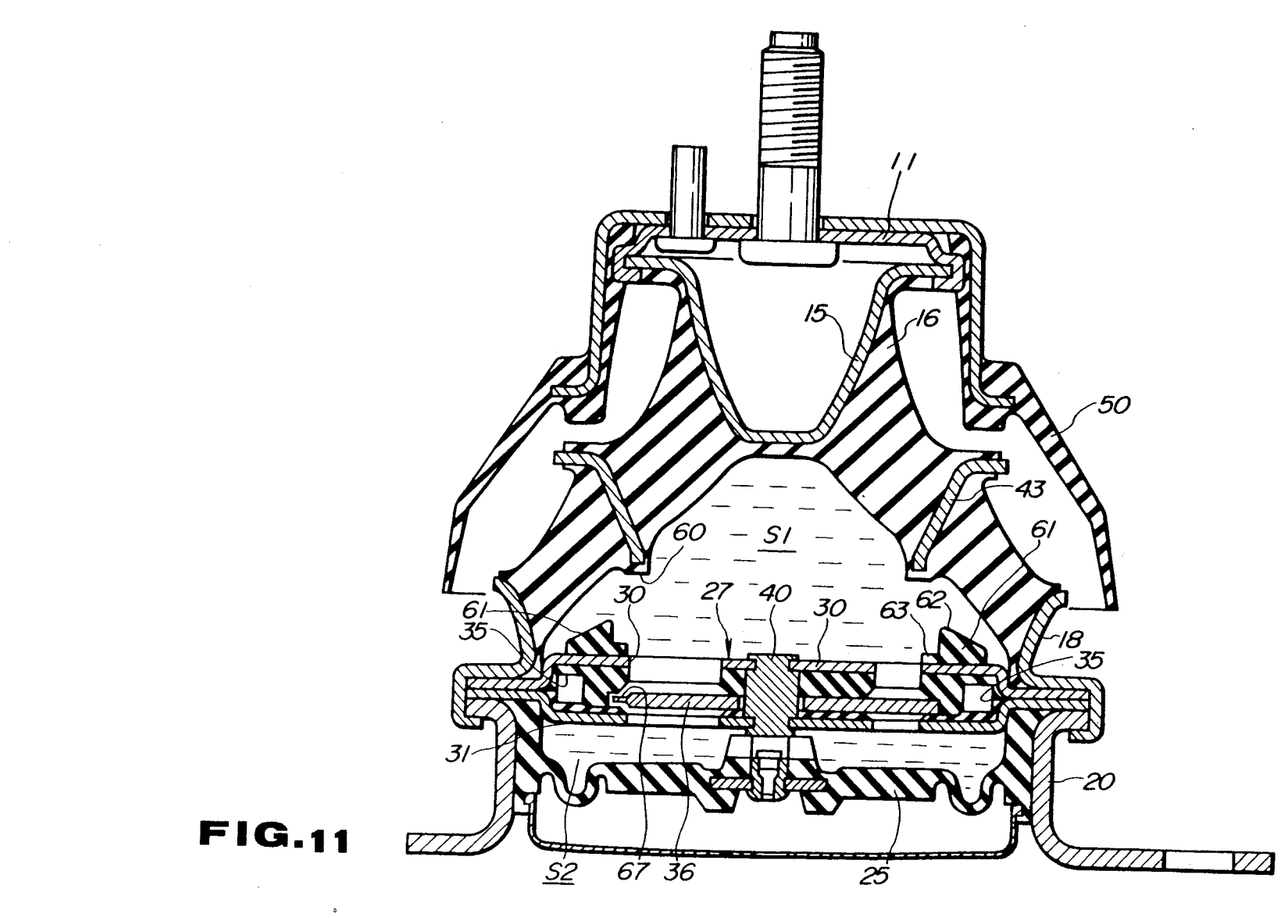
Figure 12:
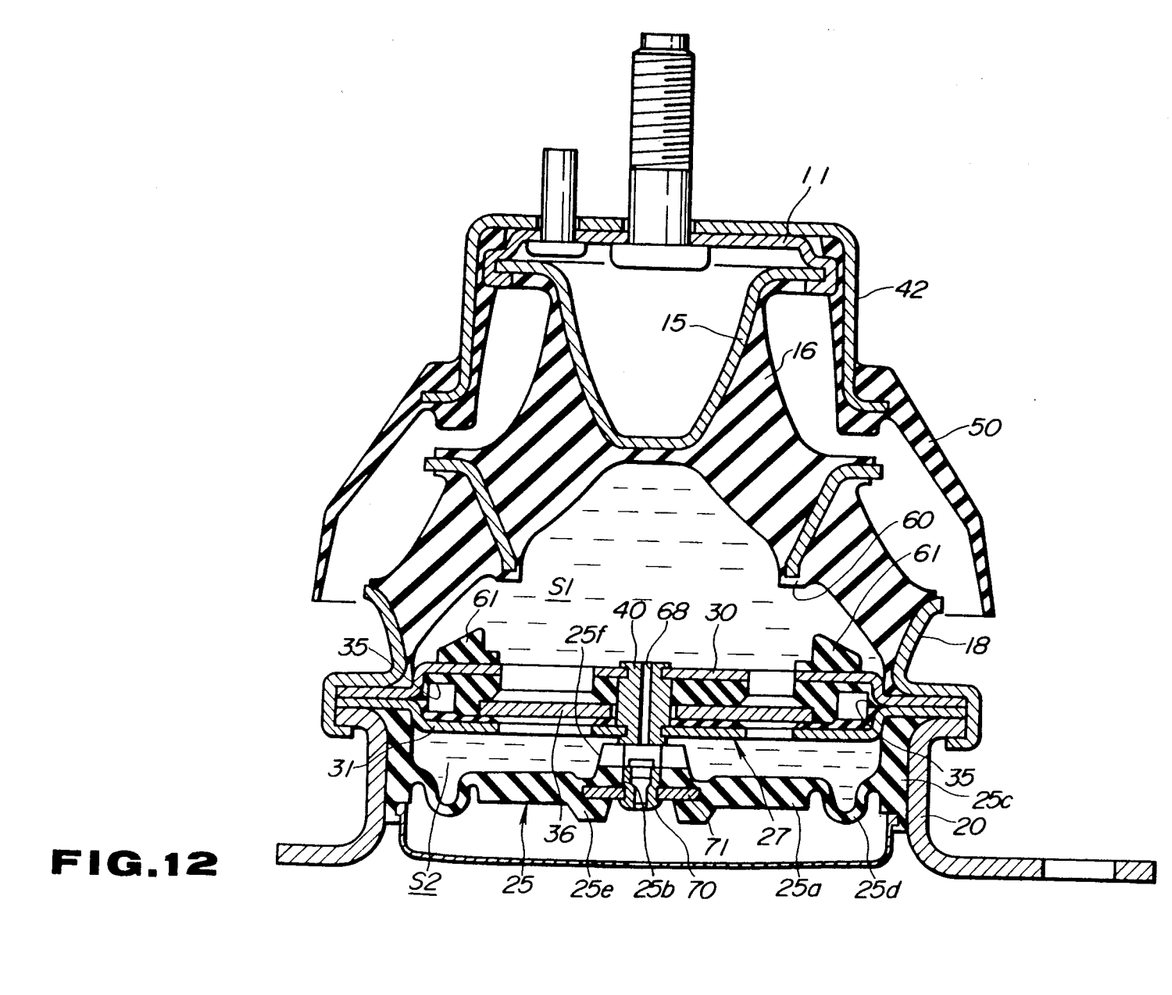

As shown in FIG. 10, a small opening 66 may be formed in the movable plate 36 so as to provide a fluid communication between the inner chamber S1a and the compensation chamber S2 after the projections 60, 61 are in contact with the horizontal surface 63 of the projection 61 and the lower surface of the resilient element 16, respectively. Alternatively, a recess 67 may be formed in the outer peripheral edge of the movable plate 36 as shown in FIG. 11, or a through hole 68 may extend axially through the spacer 40 as shown in FIG. 12.

At large amplitude vibrations, flexing of the resilient element 16 causes fluid movement through the passage 35 with a resulting high level of damping. In order to compensate for movement of the fluid between the working chamber S1 and the compensation chamber S2, the compensation chamber S2 expands or contracts by deformation of the diaphragm 25. The diaphragm 25 has a relatively low coefficient of elasticity and is more deformable than the resilient element 16. As shown in FIG. 12, the diaphragm 25 includes a thick portion 25a having a central opening 25b, a ring portion 25c secured to the inner peripheral wall of the support 20, and a thin portion 25d by which the thick portion 25a and the ring 25c re interconnected together. A plug or rivet 70 is fitted into the central opening 25b and is engagement with the inner peripheral edge of a disk 71 which is, in turn, partially embedded within the thick portion 25a of the diaphragm 25. The thick portion 25a of the diaphragm 25 has an annular ridge 25e on its lower surface and an annular ridge 25f on its upper surface. Under normal condition or when no loads are applied to the resilient element 16, the upper surface of the annular ridge 25f is in contact with the lower surface of the lower plate 31 so as to provide a constant distance between the lower plate 31 and the diaphragm 25 and thus, keep the volume of the compensation chamber S2 constant.

Figure 13:
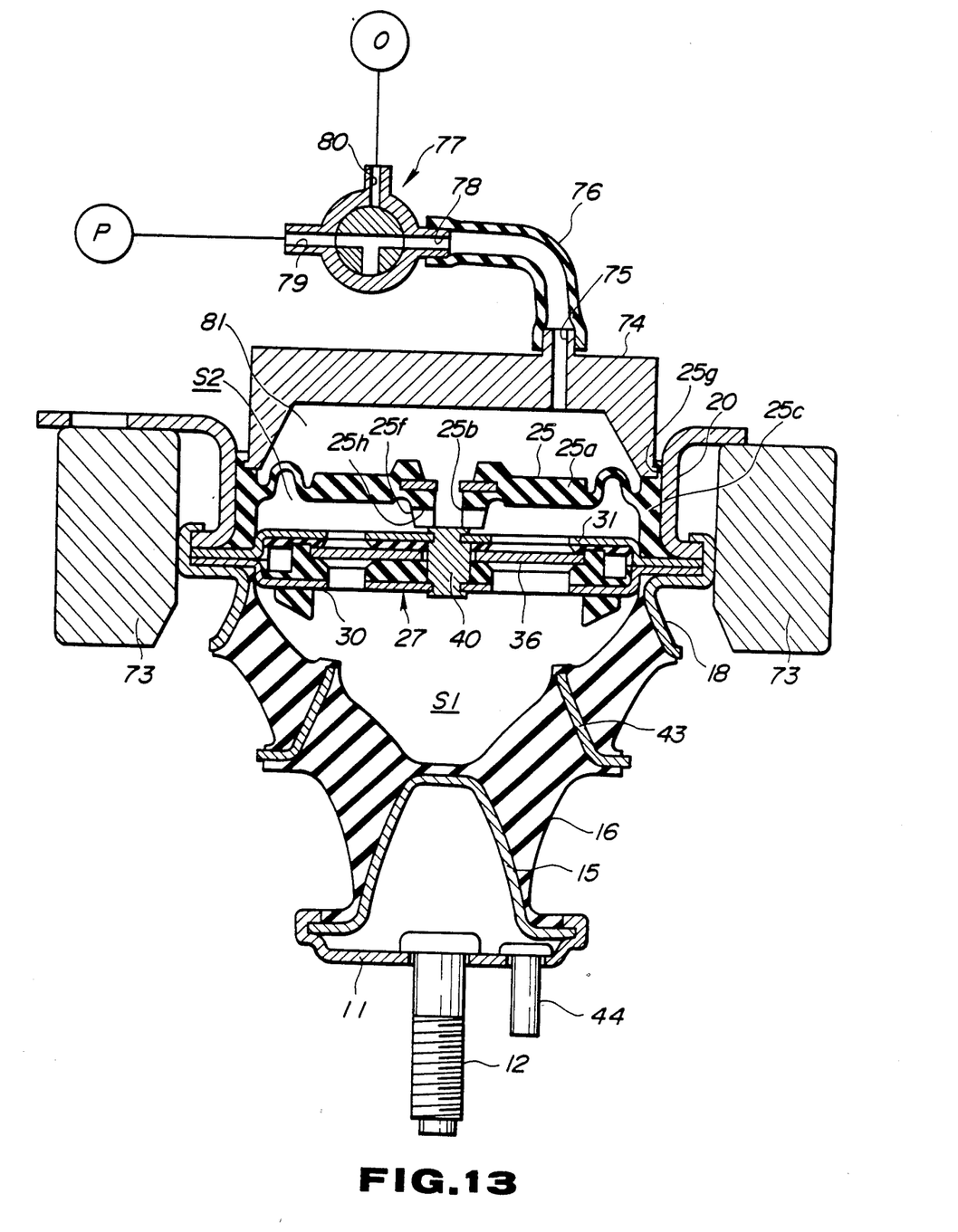
FIG. 13 shows the manner in which fluid is introduced into the compensation chamber and the working chamber.

With reference to FIG. 13, the mount 10 is positioned upside down and supported on a member 73. A suitable cover 74 is fitted at its peripheral edge into an annular groove 25g formed in the ring 25c and has an inlet 75 to which one end of a flexible hose 76 is connected. The other end of the hose 76 is connected to a valve 77 via a port 78. The valve 77 is also connected to a vacuum pump P via a port 79 as well as to an oil reservoir O via a port 80. It will be noted that a space 81 defined between the diaphragm 25 and the cover 74 is communicated with the compensation chamber S2 through the central opening 25b and radial slots 25h formed in the annular ridge 25f of the diaphragm 25. First, the valve 77 is operated to communicate the port 78 with the port 79, and the vacuum pump P is rendered operative to exhaust air in the space 81, the compensation chamber S2 and the working chamber S1. Then, the valve 77 is operated to bring the port 78 into communication with the port 80, and the oil is supplied from the oil reservoir O and introduced into the working chamber S1 and the compensation chamber S2. As stated earlier, the volume of the compensation chamber S2 is kept constant in the presence of the annular ridge 25f of the diaphragm 25. Therefore, fluid can be introduced in an amount as exactly desired.

Figure 14:
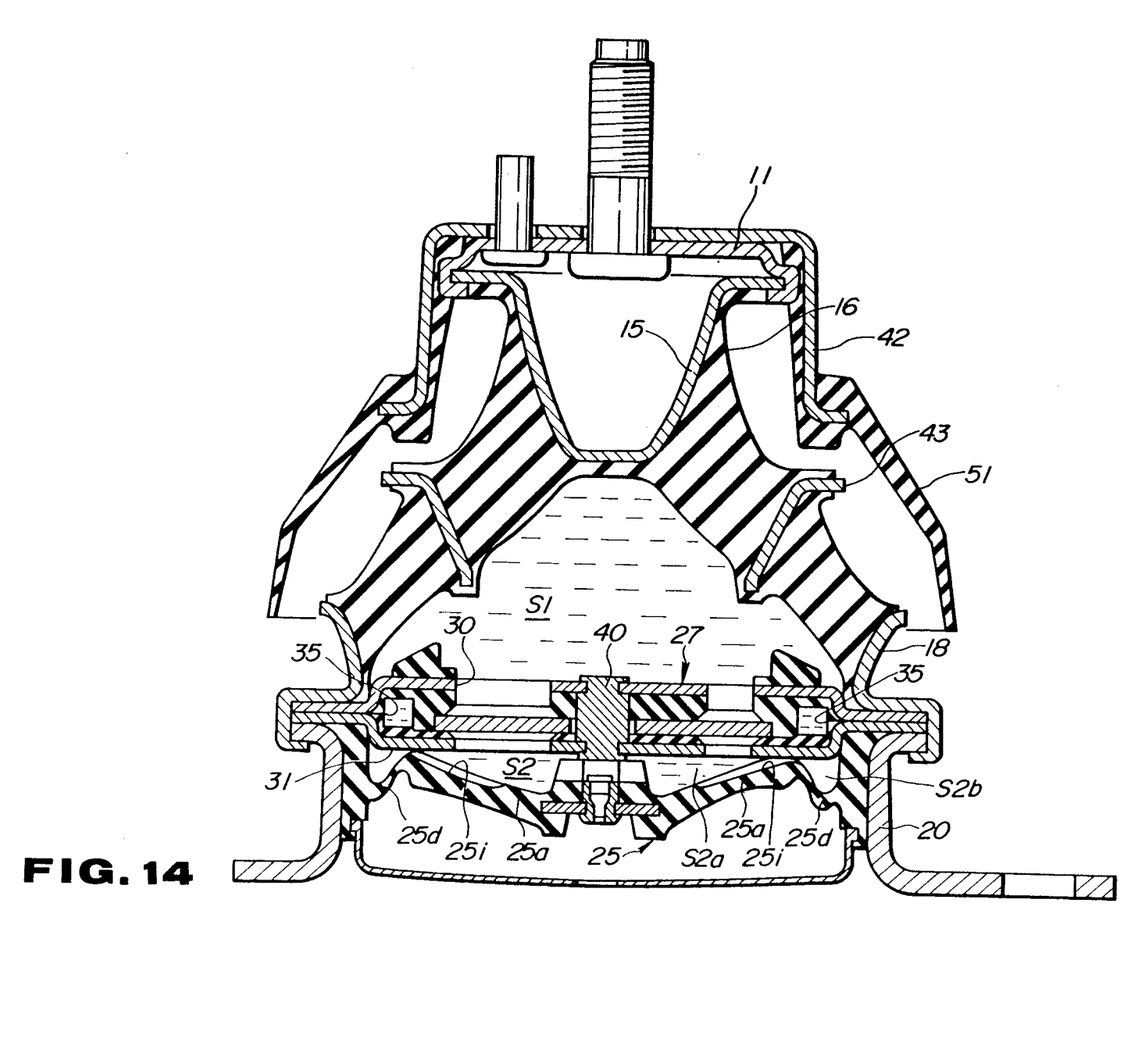
FIG. 14 is a view similar to FIG. 1, but showing another mode of a diaphragm.

When the resilient element 16 expands, the oil in the compensation chamber S2 moves into the working chamber S1 through the passage 35. At this time, a portion where the thick portion 25a and the thin portion 25d are joined is moved upwardly to abut the lower surface of the lower plate 31 as shown in FIG. 14. As a result, the compensation chamber S2 is divided into an inner chamber S2a and an outer chamber S2b. In order to provide a fluid communication between these chambers S2a, S2b, the thick portion 25a has radial slots 25i on its upper surface.

Figure 15:
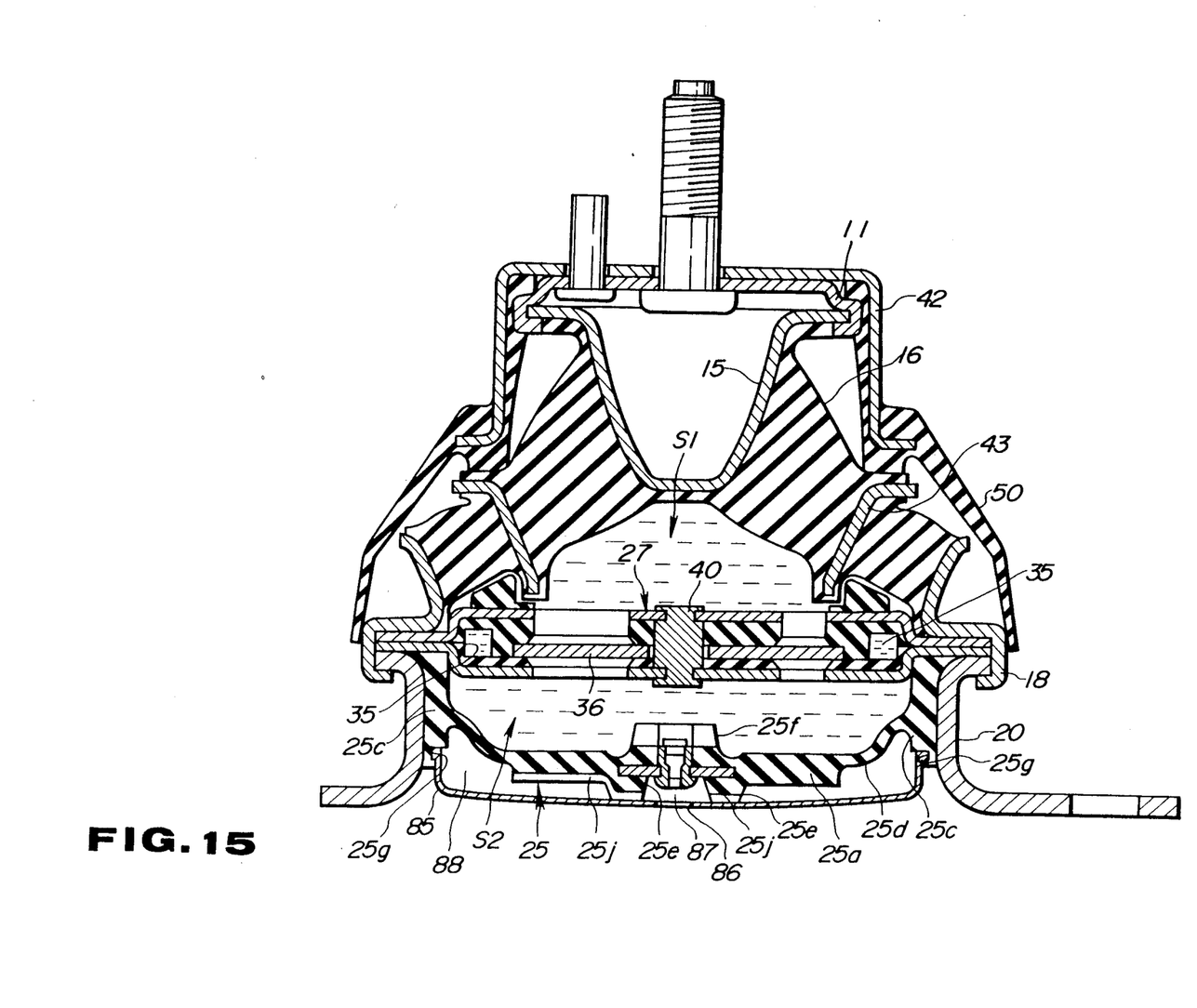
FIG. 15 is a view similar to FIG. 8, but showing a different mode of the diaphragm positioned in contact with a bottom cover.
Figure 16:
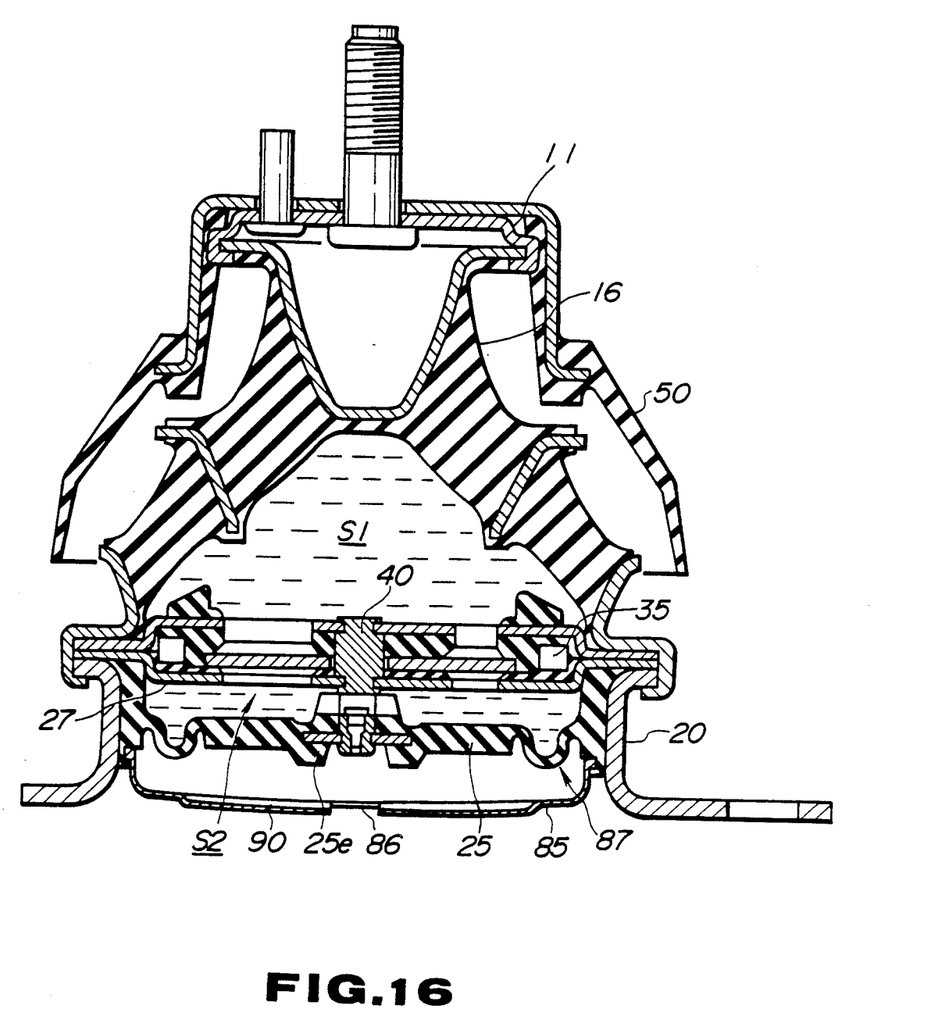
FIG. 16 shows a modified form of the bottom cover.
Figure 17:
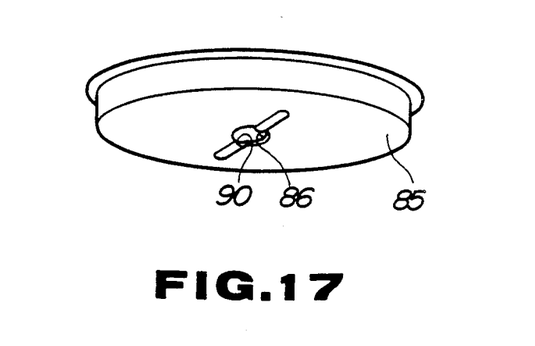
FIG. 17 is a perspective view of the bottom cover shown in FIG. 16.
Figure 18:
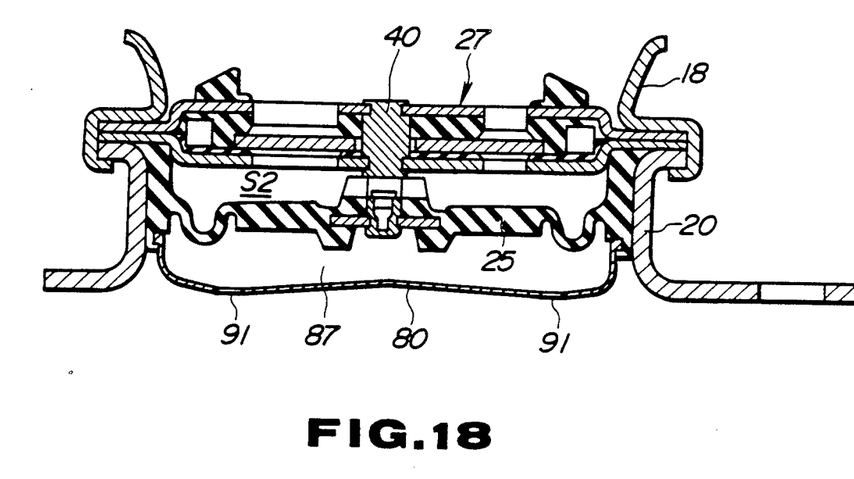
FIG. 18 is a sectional view, in part, of the mount showing a different mode of the bottom cover.

When the resilient element 26 contracts, the oil in the working chamber S1 moves to the compensation chamber S2 through the passage 35. This causes an increase in pressure in the compensation chamber S2 whereby the diaphragm 25 is moved downward, the annular ridge 25e being in contact with a bottom cover 85, as shown in FIG. 15. The bottom cover 85 is attached at its peripheral edge to the annular groove 25g in the ring 25c in a manner to protect the diaphragm 25 and has a central opening 86 through which a space 87 is led to an ambient atmosphere. When the annular ridge 25e is brought into contact with the bottom cover 85, a closed space 88 is formed in the space 87. Further increase in pressure in the compensation chamber S2 causes a corresponding increase in pressure in the space 88. To this end, release slots 25j are formed radially in the annular ridge 25e to communicate the space 88 with the space 87 so that air in the space 88 is released to the ambient atmosphere through the central opening 86. These release slots 25j may extend from the annular ridge 25e to the lower surface of the thick portion 25a. An alternative way of providing a communication between the spaces 87, 88 is to form radial depressions 90 in the bottom cover 85 as shown in FIGS. 16 and 17. Still alternatively, a plurality of openings 91 may be formed around the circumference in the bottom cover 85 as best seen in FIG. 18.

It is to be understood that the invention is not limited in its application to the details of construction and the arrangement of components set forth in the foregoing description or illustrated in the drawings. The invention is capable of other embodiments and of being practiced and carried out in various ways. Also, it is to be understood that the phraseology and terminalogy being employed herein is for the purpose of description and should not be regarded as limiting.

What is claimed is:

1. A hydraulically damped mount comprising:
   a mounting element adapted to be fixed to a moving component;
   a support adapted to be fixed to a stationary component;
   a resilient element connected between said mounting element and said support;
   a deformable element secured to said support and cooperates with said resilient element so as to define a fluid chamber, said fluid chamber being filled with an imcompressible fluid;
   a partition assembly connected to divide said fluid chamber into a working chamber and a compensation chamber and having a passage through which said working chamber and said compensation chamber are communicated with each other; and
   said partition assembly further including an upper plate and a lower plate joined together to define a space within which a movable plate is movable to absorb movement of the fluid to be caused by a change in pressure in said working chamber;
   means for maintaining a constant distance between said upper plate and said lower plate of said partition assembly, said means including a spacer centrally disposed between said upper and lower plates.

2. A hydraulically damped mount according to claim 1, wherein said spacer has opposite ends fitted over an upper surface of said upper plate and a lower surface of said lower plate, respectively.

3. A hydraulically damped mount according to claim 1, further including a press member attached to said mounting element so as to push down an intermediate portion of said resilient element when said resilient element is expanded outwardly due to an increase in pressure in said working chamber.

4. A hydraulically damped mount according to claim 3, wherein said press member has a flange, and wherein an annular ring extends into said intermediate portion of said resilient element and has a flange facing said flange of said press member.

5. A hydraulically damped mount according to claim 3, further including a protection cover having an upper section secured to the inner surface of said press member, an intermediate portion within which said flange of said press member is embedded, and a lower section depending from said intermediate portion to surround said resilient element.

6. A hydraulically damped mount according to claim 5, wherein said upper section of said protection cover has an annular recess within which a peripheral edge of said mounting element is received.

7. A hydraulically damped mount according to claim 1, wherein said partition assembly further includes upper and lower restriction elements fitted within said space defined by said upper and lower plates, and wherein said movable plate is placed between said upper restriction element and said lower restriction element.

8. A hydraulically damped mount according to claim 7, wherein all of said upper and lower plates, and said upper and lower restriction elements have a plurality of elongated openings formed at circumferentially equally spaced intervals.

9. A hydraulically damped mount according to claim 8, wherein all of said upper and lower plates, and said upper and lower restriction elements have a plurality of sectorial openings formed between each two adjacent elongated openings.

10. A hydraulically damped mount according to claim 1, further including means for preventing excess deformation of said resilient element, said means comprising a first annular projection formed on the upper surface of said upper plate of the partition assembly and a second annular projection formed on the lower surface of said resilient element, and means for providing a fluid communication between said working chamber and said compensation chamber through said passage when said first and second annular projections are in contact with each other.

11. A hydraulically damped mount according to claim 10, wherein said means for providing a fluid communication between said working chamber and said compensation chamber through said passage, comprises a plurality of radial grooves extending from the lower surface of said second annular projection and terminating at near the lower end of said resilient element.

12. A hydraulically damped mount according to claim 10, wherein said means for providing a fluid communication between said working chamber and said compensation chamber through said passage, comprises a plurality of radial grooves formed in said first annular projection.

13. A hydraulically damped mount according to claim 1, further including means for preventing excess deformation of said resilient element, said means comprising a first annular projection formed on the upper surface of said upper plate of the partition assembly and a second annular projection formed on the lower surface of said resilient element, and means for providing a fluid communication between said working chamber and said compensation chamber when said first and second annular projections are in contact with each other.

14. A hydraulically damped mount according to claim 13, wherein said means for providing a fluid communication between said working chamber and said compensation chamber, comprises at least one small opening formed in said movable plate.

15. A hydraulically damped mount according to claim 13, wherein said means for providing a fluid communication between said working chamber and said compensation chamber, comprises at least one recess formed at the peripheral edge of said movable plate.

16. A hydraulically damped mount according to claim 13, wherein said means for providing a fluid communication between said working chamber and said compensation chamber, comprises a through hole extending axially through said spacer.

17. A hydraulically damped mount according to claim 1, wherein said deformable element includes a thick portion, a ring portion secured to said support, and a thin portion by which said thick portion and said ring portion are interconnected together, said thick portion having on its upper surface an annular ridge normally in contact with said partition assembly.

18. A hydraulically damped mount according to claim 17, wherein said thick portion of the deformable element has a central opening, and said annular ridge has radial slots with which said central opening is communicated.

19. A hydraulically damped mount according to claim 17, wherein said thick portion of the deformable element has radial slots on an upper surface thereof.

20. A hydraulically damped mount according to claim 17, further including a bottom cover attached to said ring portion of the deformable element and having a central opening, and wherein said thick portion of the deformable element has release slots on a lower surface thereof.

21. A hydarulically damped mount according to claim 17, further including a bottom cover attached to said ring portion of the deformable element and having a plurality of openings formed around its circumference.

22. A hydraulically damped mount according to claim 17, further including a bottom cover attached to said ring portion of the deformable element and having radial depressions.

23. A hydraulically damped mount according to claim 1, wherein said spacer is cylindrical in shape and made of metal.

* * * * *